Jan. 8, 1929.
H. R. VAN DEVENTER
1,698,178
PROCESS OF AND MEANS FOR PRODUCING MOTION PICTURES
Filed Sept. 18, 1924    2 Sheets-Sheet 1
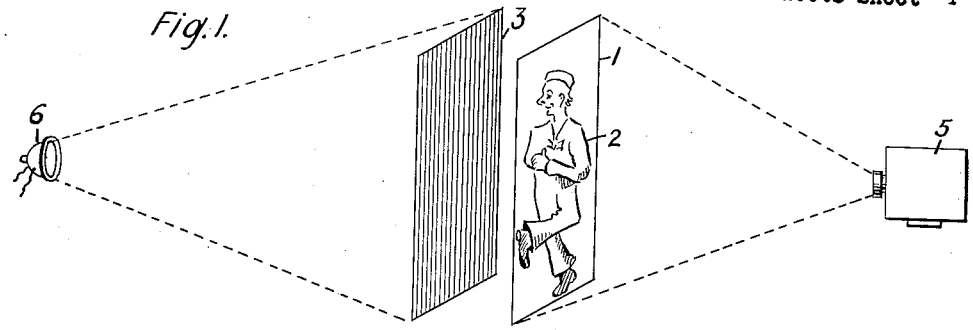
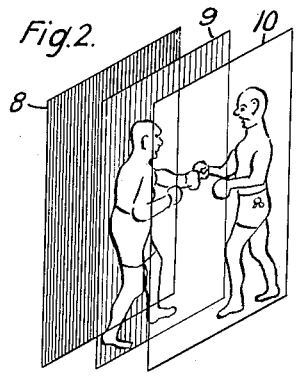 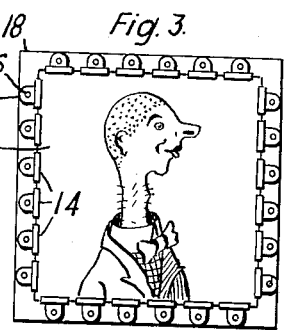 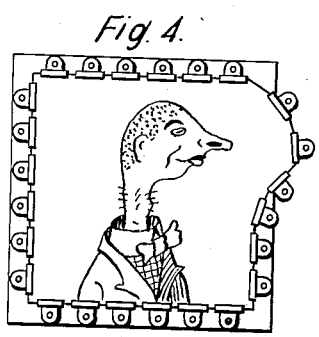
 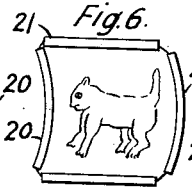 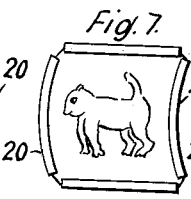 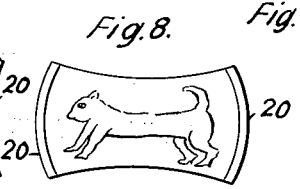 
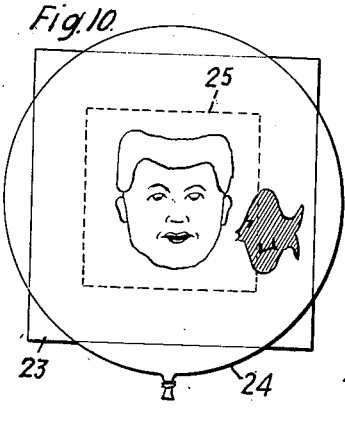 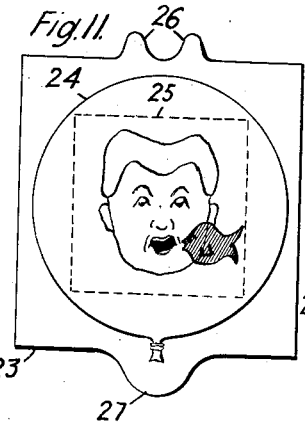 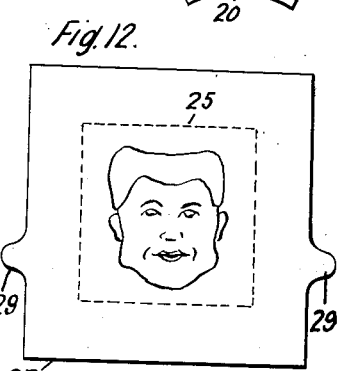
INVENTOR
*Harry R. Van Deventer*
BY
*F. H. Miller*
ATTORNEY Jan. 8, 1929.
H. R. VAN DEVENTER
1,698,178
PROCESS OF AND MEANS FOR PRODUCING MOTION PICTURES
Filed Sept. 18, 1924 2 Sheets-Sheet 2
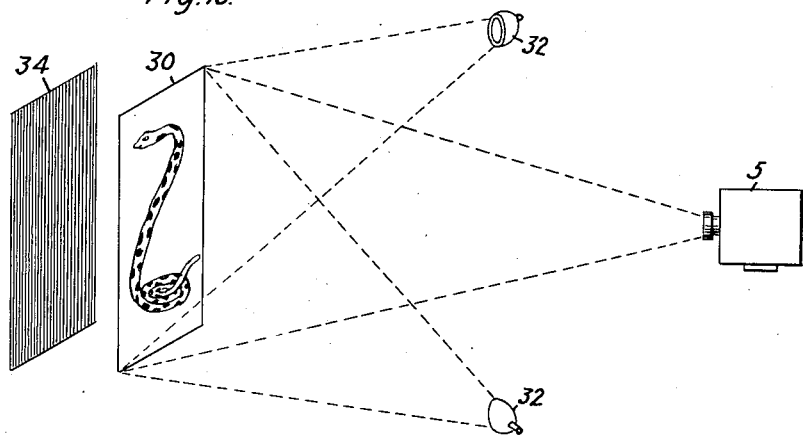
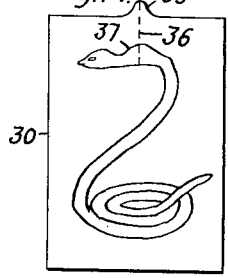 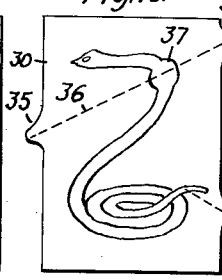 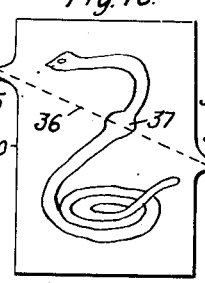 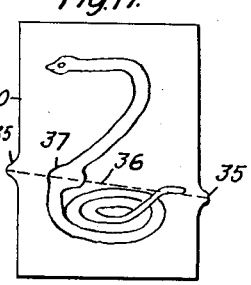
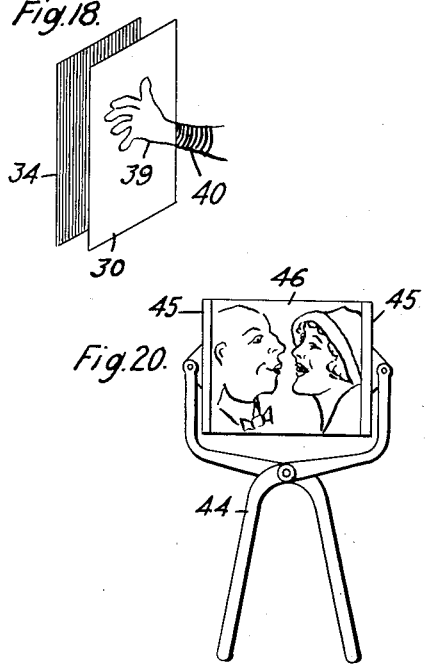
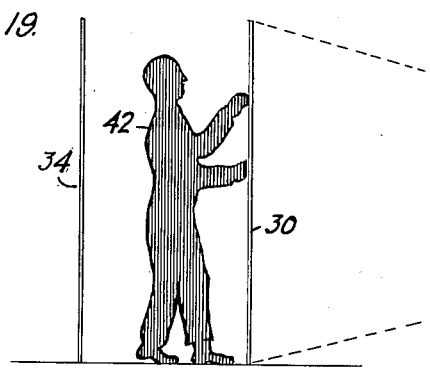
INVENTOR
Harry R. Van Deventer
BY
F. H. Miller
ATTORNEY Patented Jan. 8, 1929.

1,698,178

UNITED STATES PATENT OFFICE.

HARRY R. VAN DEVENTER, OF NEW YORK, N. Y., ASSIGNOR TO RADIO PATENTS CORPORATION, OF NEW YORK, N. Y., A CORPORATION OF NEW YORK.

PROCESS OF AND MEANS FOR PRODUCING MOTION PICTURES.

Application filed September 18, 1924. Serial No. 738,402.

My invention relates to processes of, and means for, producing motion pictures and particularly to processes of, and means for, producing animated cartoons and similar pictures.

One object of my invention is to provide a process of the above described character, that shall greatly facilitate and materially reduce the cost of producing motion pictures of a certain type.

Another object of my invention is to provide a process of, and a means for, producing motion pictures by so distorting a member having an original picture thereon and in reproducing the picture in successively different distorted forms as to avoid the necessity of providing other original pictures of the same subject in different shapes.

Another object of my invention is to provide a process and a means of the above described character by which a composite picture of independent original figures, with the figures depicted as co-operating in any desired manner, may readily be produced.

Another object of my invention is to provide a process of producing motion pictures by the use of a flexible picture or figure-bearing member whereby the picture or figure may be caused to assume many shapes and to return to its original shape.

Another object of my invention is to provide a process of, and means for producing motion pictures wherein a local or isolated part of a figure, such as the head or eye of a human figure may be caused to move, while the remainder of the figure is maintained stationary or is caused to perform independent movements.

Heretofore, in the art of producing motion pictures, such as animated cartoons and the like, it has been usual for an artist to produce, by hand, a great number of original drawings of the subject picture in different shapes and positions. This process is extremely laborious and expensive, as may readily be understood, even where every opportunity is taken to use the same one or more of these original hand-made pictures in different positions of the sequence of motion.

Many expedients for facilitating the production of such pictures have been employed, such as the tracing of portions of the figures by unskilled assistants so that the artist is only required to redraw portions of the figures.

Another suggestion for facilitating the production of animated cartoons comprises the reproduction of original pictures to different scales before being photographed on the film.

Suggestions have been made for the production of motion pictures by photographically reproducing images of distorted figures but, to the best of my knowledge, none of these suggestions has incorporated the features wherein a line drawing, a silhouette or the like of an original stationary figure, may so readily be caused to perform the life-like or wide variety of motions as by the process and means of my invention.

For instance, the idea of melting the emulsion on an ordinary photographic plate to cause distortion of an image on the plate has been suggested. By this process, the image, which does not return to its original shape, is thereby destroyed for subsequent sequences of distortion including the original shape. Also, by this process, the shape of the image is not varied by distortion of the plate and is limited to certain very specific kinds of distortions.

A further example of suggestions along this line of endeavor comprises the idea of producing motion pictures by photographing distorted reflected images of objects that are placed before highly-polished flexible metal plates. Such plates, which are on the order of the curved mirrors seen in amusement parks, are not adapted for local distortions in the planes of the polished surfaces thereof and are otherwise limited in the variety of movements through which they may be put.

In none of the prior art, of which I am aware, is there embodied or suggested my idea of distorting a flexible member or plate on which an original line drawing or other picture has been formed or placed and, while my invention particularly contemplates this suggestion as a preferred form, it is capable of greater latitude and flexibility in the art of producing motion pictures of a certain type, as will hereinafter appear.

In practicing my invention, I provide one or more background members or structures that are movable or distortable in local or isolated parts, such as sheet rubber, crepe-paper, wire-mesh and the like, or on which figures or silhouettes may be drawn, pasted, cast by shadow or otherwise placed. Images of these figures or silhouettes are transmitted, by direct or reflected light, to another member, such as a photographic film on which they are directly reproduced by chemical and light action, or on another back-ground member on which they may be traced or otherwise fixed for subsequent further reproduction on a photographic film.

Figure 1 of the accompanying drawings is a diagrammatic view of one form of set-up and apparatus for practicing the process of my invention, Fig. 2 is a view of certain elements for substitution for similar elements in the set-up of Fig. 1, Figs. 3 and 4 are views of a flexible figure-bearing sheet and a supporting frame therefor, Figs. 5 to 9, inclusive, are views of another figure bearing member in different distorted conditions, Figs. 10, 11 and 12 are views of successive stages of operating superposed figure-bearing elements, Fig. 13 is a view similar to Fig. 1 of a set-up and apparatus for practicing a modified form of the process of my invention, Figs. 14 to 17, inclusive, are views of a picture-bearing member for use in either of the forms of the process represented by the Figures 1 and 13, showing a method of effecting successive distortions thereof, Figs. 18 and 19 are detail views of elements employed in the form of the process represented by Fig. 13, and Fig. 20 is a view similar to Figs. 3 and 4, of a particular means for facilitating the process of my invention.

In the simplest form of my invention, as illustrated in Fig. 1, a translucent or other light-transmitting member 1, having a fanciful figure 2 thereon and constructed of flexible material, such as very thin sheet rubber, is placed between a light-diffusing element or sheet 3 and a motion-picture camera 5. The element 3 is adapted to diffuse the light that is directed from a lamp 6 toward the figure-bearing member 1.

In operation, the figure 2, which in this instance may represent a sailor in the act of dancing a horn pipe, may be caused to assume different shapes by stretching the rubber sheet 1. This stretching may be effected in various ways, as will hereinafter be pointed out.

In each new position to which the figure is changed, the camera 5 may be operated to expose one or more sections of film, so that consecutive images of the figure in different shapes are recorded for reproduction on a screen.

As shown in Fig. 2, sheets 8, 9 and 10 may be substituted for the sheets 1 and 3 of Fig. 1, the sheet 8 corresponding to the sheet 3 and the sheets 9 and 10 corresponding to the sheet 1 in that they each bear a figure to be photographed with the other.

In this instance, two boxers, one on each of the sheets 9 and 10, are adapted for cooperation with each other by bodily movement of the sheets, by distortion of the sheets or by any of various combinations of distortion and movements of the sheets. Also, one of these sheets may constitute only a still-life back-ground member for the other.

The sheets 1, 9 and 10 of Figs. 1 and 2 may conveniently be mounted, as illustrated in Figs. 3 and 4. In Fig. 3, a sheet 12, corresponding to the sheets 1, 9 and 10, is provided with a plurality of members 14 that are clamped or otherwise secured thereto around the edges thereof. Apertured portions 15 of the clamps 14 constitute operating handles for mounting on pins 16 of a framework 18, from which they may be detached, one or more at a time, for producing distortions of local portions only of a figure. In this instance, the head of a figure is caused to move forward and to be enlarged or elongated at the same time by removing certain only of the clamps 14 from one side of the framework 18. Various other distortions may readily be effected by detaching and operating other clamps 14.

As illustrated in Figs. 5, 6 and 7, a figure may be caused to assume different attitudes by stretching its supporting sheet along a certain axis in the plane of the sheet, while certain edges are held stationary. In this form, flexible clamps or edge-reinforcing members 20, such as flexible steel strips or strips of whale-bone, are provided on edges to be flexed, while rigid members 21 are mounted on other edges of the sheet. By this arrangement, a symmetrical or uniform distortion of the sheet is obtained, in contradistinction to the local distortion illustrated in Fig. 4. In Figs. 8 and 9, the rigid members 21 are removed to permit the unsupported edges to flex inwardly upon the flexing the resilient edge-supporting member 20.

Figs. 10, 11 and 12 illustrate another method of producing composite pictures from a plurality of superposed translucent or transparent members. In Fig. 10 a translucent sheet 23 is provided with the figure of a human head. Over this figure may be supposed, a transparent member 24, such as a balloon, on which another figure has been formed. In this instance, the figure on the balloon 24 represents a fish which, when the balloon is greatly enlarged by inflation, becomes relatively large compared to the human head on the member 23. A dotted-line square 25 on each of the figures 10, 11 and 12, represents the outer boundaries of the area to be reproduced on a photographic film by the motion-picture camera 5 of Fig. 1.

In Fig. 10, with the balloon inflated to the size desired, the fish may be caused to approach the figure on the sheet 23 by turning the balloon. At the same time, the air may be permitted to slowly escape from the balloon, to gradually decrease the size of the fish as it approaches the mouth of the rear figure. As the fish approaches nearer and nearer to the mouth of the human head, the latter may be caused to assume various grimaces, such as illustrated in Fig. 11, in which the eyes are elevated by stretching the sheet 23 upwardly at portions 26 and the mouth is opened by stretching the sheet 23 downwardly at a portion 27. At this juncture, the motion picture camera may be stopped while the balloon 24 is removed entirely from its range, and the photographing operation renewed to reproduce further grimaces of the figure on the sheet 23. As shown in Fig. 12, the sheet 23 is stretched laterally at portions 29 to cause the cheeks of the head to bulge as though the fish had been taken into the mouth.

Figure 13 illustrates a somewhat different set-up for practicing the process of my invention in that, instead of illuminating the figure-bearing sheet 30 from the rear, as in Fig. 1, it is illuminated by a lamp or lamps 32 that are placed to direct their light from aside the range of the camera 5 toward the front side of the sheet 30. In this arrangement of parts, an opaque back-ground member or sheet 34 is provided for the sheet 30 to cause the latter to be highly reflecting. Also, in this set-up certain of the above described figure bearing members may be employed and distorted in the manners set forth.

Figures 14, 15, 16 and 17 show the sheet 30 of Fig. 13 in successive stages of distortion which is effected, similarly to the above-described methods, by stretching the sheet from local parts of its edges, while the remainder of the sheet is held stationary, as by the structure shown in Figs. 3 and 4.

In Figs. 14 to 17, inclusive, a reptile may be caused to appear to swallow an object by successively stretching portions 35 in the directions of dotted lines 36, intersecting which a bulge 37 may be shifted to different positions along the reptile's body. When these successive pictures are reproduced on a film and subsequently cast onto a screen, the reptile will appear to swallow the object.

However, with the set-up of Fig. 13, greater latitude in the possible variety of distortions to which the figures may be subjected is permitted, as illustrated in Figs. 18 and 19.

In Fig. 18, with the translucent sheet 30 and the opaque back-ground wall or sheet 34 of Fig. 13 disposed as shown, an operator's hand 39, having an opaque glove 40 thereon, may be placed behind the figure-bearing sheet 30 without reproducing on the film. Thus, extremely small parts of a figure, such as only one eye or one corner of the mouth of a human face, may be caused to assume positions of various sorts by manipulation of the fingers of the hand 39.

As shown in Fig. 19, in which the sheets 30 and 34 are illustrated in edge view and on a somewhat larger scale, an operator 42, clad entirely in an opaque costume, may operate freely behind the figure bearing sheet 30.

A further means for distorting the figure-bearing sheets of either of the set-ups, above described, is shown in Fig. 20, in which a tongs device 44, having portions 45 for clamping or other attachment to the edges of a sheet 46, may be manipulated to stretch the sheet and to, thereby, cause the figures to assume various positions.

My invention, in addition to the preferred use of thin translucent sheet rubber as the figure-supporting means, contemplates the employment of various other elements, such as crepe-paper, wire or fabric mesh and any other element or expedient by which substantially the same process may be practiced. In other words, while I have shown and described only flexible sheets having original figures thereon which are reproduced directly on photographic films, my invention contemplates the reproduction of cast shadow figures which are distorted by distorting the member on which they are cast, by tracing of images cast from distortable figure-bearing members and the use of any substantially equivalent picture or figure supporting structure by which the figures may be similarly moved and distorted.

I desire, therefore, that my invention be not limited to the specific details illustrated, since it may be variously modified without departing from the spirit and scope thereof, as set forth in the appended claims.

What I claim as my invention is:

1. The process of producing motion pictures which comprises superposing a plurality of light-transmitting members having figures thereon one of which is capable of being distorted, in distorting said distortable member and in photographically reproducing composites of said figures.

2. The process of producing motion pictures which comprises superposing a plurality of distortable light-transmitting members having figures thereon, in distorting a plurality of said members and in photographically reproducing composites of said figures.

3. The process of producing motion pictures which comprises superposing a plurality of figure-bearing translucent rubber members in distorting one of said members, illuminating same, and in photographically reproducing composites of said figures.

In testimony whereof, I have hereunto subscribed my name this 12th day of September, 1924.

HARRY R. VAN DEVENTER.